United States Patent

[11] 3,586,358

| [72] | Inventor | Lothar Kiesow |
| | | Oldenburg, Germany |
| [21] | Appl. No. | 844,077 |
| [22] | Filed | July 23, 1969 |
| [45] | Patented | June 22, 1971 |
| [73] | Assignee | Licentia Patent-Verwaltungs GmbH |
| | | Frankfurt am Main, Germany |
| [32] | Priority | July 23, 1968 |
| [33] | | Germany |
| [31] | | P 17 75 275.9 |

[54] BEARING CHUCK
7 Claims, 7 Drawing Figs.

[52] U.S. Cl. .................................................. 287/88, 287/21
[51] Int. Cl. ....................................................... F16c 11/06
[50] Field of Search ......................................... 287/88, 87, 90 A, 90 C, 21; 308/72; 29/149.5 B, 149.5 NM, 441

[56] References Cited
UNITED STATES PATENTS

| 2,999,708 | 9/1961 | Dudash .......................... | 287/87 |
| 3,367,728 | 2/1968 | Labbie .......................... | 308/72 X |
| 3,371,398 | 3/1968 | Patterson et al. .............. | 308/72 X |
| 3,391,290 | 7/1968 | Hahndorf et al. .............. | 308/72 UX |

Primary Examiner—Reinaldo P. Machado
Assistant Examiner—Andrew V. Kundrat
Attorney—Spencer & Kaye ABSTRACT: A hole in a bearing chuck is seated in a glass-fiber-reinforced plastic plate and held tightly by retaining arms positioned around the hole and extending from the face of the plate. As measured when in its seated position, the chuck has a predetermined axial length parallel to the axis of the hole. The chuck is inserted and withdrawn between two adjoining retaining arms in a position rotated 90° from the seated position about a seating axis perpendicular to the axis of the hole, the two adjoining retaining arms being spaced from one another, one on each side of the seating axis, at least a distance equal to the axial length of the chuck.

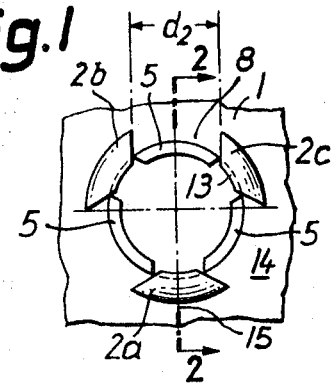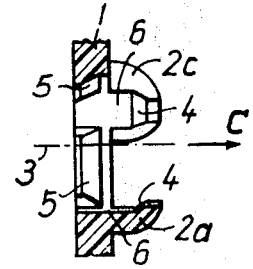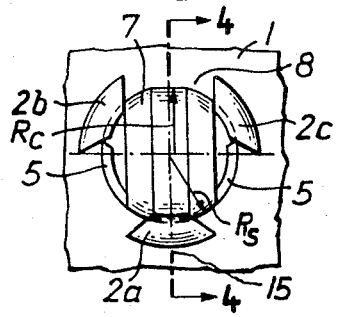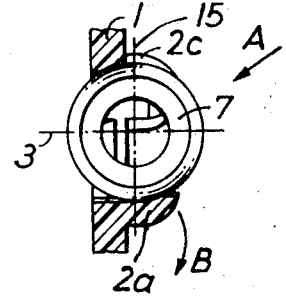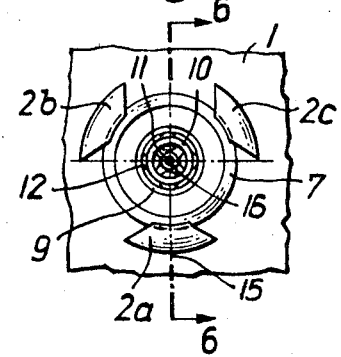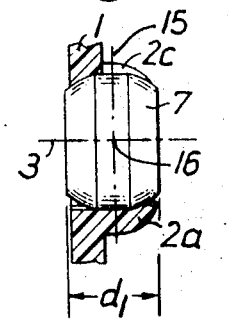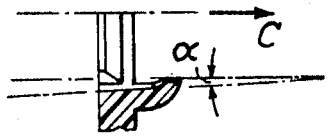

3,586,358

BEARING CHUCK

BACKGROUND OF THE INVENTION

The present invention relates to a plastic holder for a bearing chuck and to the assembly of the two.

In plastic holders of the prior art, the chuck is pressed into position and this pressing is accompanied by a distending of an opening of somewhat smaller inner diameter than the outer diameter of the chuck. Rather high requirements are placed on the elasticity and pliability of such plastic holders. Consequently, the strength of the plastic is relatively low. Moreover, the hold exerted on the chuck as a result of the elastic distention of the plastic of the holder is unsatisfactorily small, especially for larger bearings.

High strength is exhibited by glass-fiber-reinforced plastic. However, its brittleness is so high, that a pressing in of a bearing chuck in the manner described above would lead to a fracturing of the plastic holder.

SUMMARY OF THE INVENTION

An object of the present invention, therefore, is to provide a bearing chucking holder design which will allow the use of a strong but brittle plastic as the material of construction, without there being danger of a cracking of the holder during assembly with a bearing chuck.

Another object of the invention is to provide a bearing chuck holder design that can be easily manufactured by casting or injection molding.

These as well as other objects which will become apparent in the discussion that follows are achieved, according to the present invention, by providing, in a holder, axially protruding retaining arms with abutment surfaces for bearing on a chuck in a seated position and by spacing at least two adjoining retaining arms a distance equal to the dimension of the chuck into the holder when in its seated position.

BRIEF DESCRIPTION OF THE DRAWINGS

FIG. 1 is a front view of a plate and a hole.
FIG. 2
FIG. a sectional view along the line 2—2 of FIG. 1.
FIG. 3 is a view as in FIG. 1, additionally including a second part in the process of being assembled with the plate.
FIG. 4 is a sectional view along the line 4—4 of FIG. 3.
FIG. 5 is a view as in FIGS. 1 and 3, with the second part in assembled position.
FIG. 6 is a sectional view along the line 6—6 of FIG. 5.
FIG. 7 is a modification illustrated using the bottom half of FIG. 2.

DESCRIPTION OF THE PREFERRED EMBODIMENTS

A first body in the form of a fiber-glass-reinforced plastic plate 1 is shown in FIGS. 1 and 2. The plate 1 has been provided with a hole 13 and, protruding from its face 14, integral retaining arms 2a, 2b, and 2c positioned about the hole. The axis of the hole is indicated in the figures with numeral 3. The retaining arms 2a, 2b, 2c may be slightly resilient if the production process gives difficulty in observing tolerances. The walls of the hole 13 comprise in a preferred embodiment a cylindrical bounding surface 6, spherical abutment surfaces 4, and spherical opposing abutment surfaces 5. As projected onto the plane of FIG. 1, the surfaces 5 lie between the retaining arms 2a, 2b, and 2c for reasons of casting mold design.

FIGS. 3 and 4 show a second body in the form of 17 in bearing chuck 7, in one stage of its assembly into the hold 13 of the plate 1. The outer surface of the bearing chuck 7 comprises a central cylindrical surface of radius $R_c$ and two adjoining spherical surfaces of radius $R_s$. The bearing chuck 7 is placed into its position shown in FIGS. 3 and 4 by a manual pressing in the direction of arrow A in FIG. 4. In order that the bearing chuck reach the position of FIGS. 3 and 4, retaining arm 2a deflects elastically in the direction of arrow B in FIG. 4. This manner of assembly is especially suited for use with a glass-fiber-reinforced plastic, since the arm 2a need only undergo a slight strain as compared with the previously required distention of an opening and the danger of a cracking of the plate or of the retaining arm is thus eliminated. Moreover, since only a slight strain is required, the retaining arms can be made correspondingly stiffer to assure a tight holding of the bearing chuck 7 in its final seated position.

In the position of FIGS. 3 and 4, the spherical surfaces of radius $R_s$ of the bearing chuck are practically bearing against the spherical surfaces 4 and 5, except for a slight amount of mismatch caused by the different orientations of the cylindrical surfaces 6 and $R_c$. This mismatch is accommodated by the deflection of retaining arm 2a.

Rotation of the bearing chuck 7 through 90° about the seating axis 15 brings the bearing chuck into its seated position, in which it is shown in FIGS. 5 and 6. The seating axis 15 is perpendicular to the hole axis 3. In the seated position, the spherical surfaces of radius $R_s$ are bearing against the spherical abutment surfaces 4 of the retaining arms 2a, 2b, and 2c and against the spherical opposing abutment surfaces 5, while the cylindrical surface of radius $R_c$ is bearing against the cylindrical bounding surface 6.

In FIG. 5, the bearing chuck 7 is shown being used to hold a ball bearing comprising an outer ring 9, a separator 10, an inner ring 11 and balls 12.

It will be evident to one skilled in the art that the embodiment of FIGS. 1—6 is capable of certain modifications. For example, the abutment surfaces 4 and 5 can be made conical or planar, instead of spherical, provided that the minimum distance of these surfaces from spherical center 16 in FIGS. 5 and 6 is equal to $R_s$.

In order that the bearing chuck 7 be capable of assembly and disassembly with plastic plate 1, it is important that the axial length $d_1$ (FIG. 6) measured in the direction of the axis 3 of the hole 13 be less than or about equal to the dimension $d_2$ (FIG. 1) of gap 8 between an adjoining two of said retaining arms, in this instance arms 2b and 2c, one lying on each side of the seating axis 15.

In the direction out of hole 13 along its axis 3, as represented by arrow C in FIG. 2 it is shown by the cross sections of FIGS. 2, 4, and 6 that the abutment surfaces 4 incline toward the axis 3, so that the bearing chuck 7 is held securely in its seated position in hole 13.

The elements of the cylindrical surface 6 lying between the protrusions of the abutment surfaces 5 may be given a slight conical tilting toward a conical vertex lying in the direction of arrow C far to the right of FIG. 2, in order to facilitate removal of the plate 1 from a mold after having been cast. This is shown in FIG. 7, where the conical tilt angle $\alpha$ has been exaggerated, since it would otherwise not be readily apparent in a drawing. The tilting extends to the abutment surfaces 4.

While the bearing chuck 7 has been shown used to hold a ball bearing, it may be used as a bearing bush in which case a motor shaft would be journaled in contact with the bore surface which outer ring 9 is shown contacting in FIG. 5. Also, the bearing chuck 7 can itself form the outer ring of a ball bearing. The sphericity of the surface of radius $R_s$ may be used in conjunction with enlargement of the spherical abutment surfaces 4 and 5 to allow the axis of the bore surface which outer ring 9 is shown contacting in FIG. 5 to follow remain shaft of an electrical motor journaled against this bore surface, should there be any tilting of the motor shaft axis.

bearing 2. chuck holder is made of a glass-fiber-reinforced material, e.g. "Ultramid A 3 G 7," manufactured by the "Badische Anilin und Soda Fabrik" (BASF), Ludwigshafen, Germany, or "Maranyl A 190," manufactured by the "Imperial Chemical Industries Ltd." (ICI), Welwyn Garden City, Herts, England. These materials contain 30 percent glass fiber.

Each of these materials is a partially crystalline polymer, which consists of caprolactam, dicarbonic acids (e.g. sebacic acid and adipinic acid), and diamines (e.g. hexamethylenediamine). Each is a uniform polyamide. The mechanical properties of the final product vary with the air moisture and are:

yield point = 600—850 Kiloponds/cm$^3$
ductile yield = 40—170 percent pivoting position.
limit bending stress = 1,100—500 kiloponds/cm$^2$.
melting point = 260° C.

It will be understood that the above description of the present invention is susceptible to various modifications, changes and adaptations.

I claim:

1. An assembly comprising a first body having a hole extending from a face thereof, said hole having an axis, a second body situated in a seated position in said hole and having a predetermined axial length measured in the direction of the axis of said hole, said first body having at least three retaining arms protruding from said face and positioned about said hole, said retaining arms having abutment surfaces bearing against said second body in said seated position, said second body being rotatable 90° out of and into its seated position about a seating axis perpendicular to the axis of said hole, an adjoining two of said retaining arms being spaced from one another, one on each side of said seating axis, at least a distance equal to said predetermined axial length of said second body into said hole.

2. An assembly as defined in claim 1, said first body having opposing abutment surfaces bearing against said second body in its seated position on the side of said second body opposite to that on which the abutment surfaces of the retaining arms bear, said opposing abutment surfaces lying between said retaining arms as projected onto a plane perpendicular to the axis of said hole.

3. An assembly as claimed in claim 2, said hole of the first body being defined in part by a cylindrical bounding surface extending to the abutment surfaces of the retaining arms between said opposing abutment surfaces.

4. An assembly as claimed in claim 2, said hole of the first body being conically tilted up to the abutment surfaces of the retaining arms between said opposing abutment surfaces.

5. An assembly as claimed in claim 1, said first body having the form of a plate, the axis of said hole being perpendicular to the plane of said plate.

6. An assembly as claimed in claim 1, said first body made of glass-fiber-reinforced plastic.

7. An assembly as claimed in claim 1, said retaining arms being slightly resilient.